US006776718B2

(12) United States Patent
Tu

(10) Patent No.: US 6,776,718 B2
(45) Date of Patent: Aug. 17, 2004

(54) CLUTCHING DEVICE FOR A CRANE

(76) Inventor: Hsueh-Chuan Tu, No. 46, Daming Rd., Fengyuan City, Taichung Hsien (TW)

(*) Notice: Subject to any disclaimer, the term of this patent is extended or adjusted under 35 U.S.C. 154(b) by 0 days.

(21) Appl. No.: 10/217,100

(22) Filed: Aug. 12, 2002

(65) Prior Publication Data

US 2004/0029643 A1 Feb. 12, 2004

(51) Int. Cl.[7] .......... F16D 13/40
(52) U.S. Cl. .......... 464/46; 192/55.1
(58) Field of Search .......... 464/30, 45, 46, 464/158, 160; 192/55.1

(56) References Cited

U.S. PATENT DOCUMENTS 2,501,096 A * 3/1950 Robins et al. .......... 192/15
2,651,530 A * 9/1953 Blydenburg .......... 403/258
2,857,750 A * 10/1958 Fox .......... 464/9
3,092,983 A * 6/1963 Huber .......... 464/46
3,201,953 A * 8/1965 Firth .......... 464/46
4,496,136 A * 1/1985 Maeda .......... 254/350
6,295,910 B1 * 10/2001 Childs et al. .......... 83/698.11

* cited by examiner

*Primary Examiner*—Lynne H. Browne
*Assistant Examiner*—K. Thompson
(74) *Attorney, Agent, or Firm*—Jackson Walker LLP

(57) ABSTRACT

A clutching device has a main shaft, a hub, a pushing disk and a transmitting gear. The hub is securely attached to the main shaft and has a shoulder formed on one end of the hub. The pushing disk is securely attached to the hub. The transmitting gear is rotatably mounted on the hub and is sandwiched between the shoulder of the hub and the pushing disk. The transmitting gear has a recess defined in each respective side of the transmitting gear, and two clutch pads are respectively received in the recesses in the transmitting gear and respectively abut the shoulder on the hub and the pushing disk. Accordingly, it is not necessary to replace the transmitting gear when only one of the clutching pads is worn away, such that the cost for maintaining the clutching device in a good operational condition is reduced.

13 Claims, 8 Drawing Sheets

CLUTCHING DEVICE FOR A CRANE

BACKGROUND OF THE INVENTION

1. Field of the Invention

The present invention relates to a clutching device, and more particularly to a clutching device for a crane and that has a low cost for maintaining the clutching device in a good operational condition.

2. Description of Related Art

To stop a crane encountering an overload situation, a brake device or a clutching device is always mounted on the crane. With reference to FIGS. 5 and 6, a conventional brake device for a crane comprises a main shaft (50), a transmitting gear (56), a pushing disk (53), a brake disk (54) and two brake pads (55). The main shaft (50) has a threaded portion (52) and a transmitting portion (51) with multiple teeth formed on the outer periphery of the main shaft (50). The transmitting portion (51) is connected to a lifting device (not shown) of the crane. The transmitting gear (56) and the pushing disk (53) are mounted on and engage with the threaded portion (52) of the main shaft (50). The transmitting gear (56) is connected to the shaft of a motor (not shown). The brake disk (54) is rotatably mounted between the transmitting gear (56) and the pushing disk (53). The brake pads (55) are respectively mounted on two sides of the brake disk (54) and respectively correspond to the transmitting gear (56) and the pushing disk (53). A securing collar (57) is securely attached to the main shaft (50) and abuts against the transmitting gear (56) to hold the transmitting gear (56) on the main shaft (50).

When the crane is in a normal use, the brake pads (55) are far from the transmitting gear (56) and the pushing disk (53). The main shaft (50) will be actuated to rotate by the motor with the transmission of the transmitting gear (56), and the lifting device of the crane will operate to lift an object.

When the loading to the crane exceeds the designated level of the crane, the main shaft (50) will rotate in reverse due to the large loading. The pushing disk (53) will move along the threaded portion (52) while the main shaft (50) reversely rotates and will abut against the corresponding brake pad (55) so as to push the brake disk (54) and the other brake pad (55) to abut against the transmitting gear (56). Consequently, a brake effect is provided.

However, the brake pads (55) in the conventional brake device are easily worn away after a period time of use. When the brake pads (55) are excessively worn away, a larger distance is needed for the pushing disk (53) moving to push against the brake pad (55). A brake effect cannot be promptly applied when the loading applied to crane exceeds the designated level.

With reference to FIGS. 7 and 8, a conventional clutching device for a crane comprises a main shaft (70), a transmitting gear (60) and two pushing disks (72). The transmitting gear (60) is rotatably mounted on the main shaft (70) and is connected to the shaft of a motor (not shown). Two clutching pads (61) are respectively mounted on two sides of the transmitting gear (60). The pushing disks (72) are securely mounted on the main shaft (70) and respectively abut the clutching pads (61). When the motor is switched on, the transmitting gear (60) is actuated to rotate. The pushing disks (72) will rotate with the transmitting gear (60) by means of the friction between the clutching pads (61) and the pushing disk (72), such that the main shaft (70) will rotate with the transmitting gear (60). Consequently, the lifting device connected to the main shaft (70) will be actuated to operate.

When the loading of the lifting device exceeds the designed level, i.e. the loading applied to the main shaft (70) is larger than the friction between the pushing disks (72) and the clutching pads (61), the transmitting gear (60) will rotate relative to the pushing disks (72). The pushing disks (72) and the main shaft (70) will not rotate with the transmitting gear (60), and the lifting device will not operate.

However, because the clutching pads (61) of the conventional clutching device are integrally mounted on the transmitting gear (60), the whole transmitting gear (60) must be replaced with a new one when even only one of the clutching pads (61) is worn away. The cost for maintaining the clutching device in a good operational condition is high, and it is wasteful to replace the transmitting gear (60) that just has a single clutching pad (61) excessively worn.

To overcome the shortcomings, the present invention tends to provide a clutching device to mitigate or obviate the aforementioned problems.

SUMMARY OF THE INVENTION

The main objective of the invention is to provide a clutching device and having a low cost for maintaining the clutching device in a good operational condition. The clutching device has a main shaft, a hub, a pushing disk and a transmitting gear. The hub is securely attached to the main shaft and has a shoulder formed on one end of the hub. The pushing disk is securely attached to the hub. The transmitting gear is rotatably mounted on the hub and is sandwiched between the shoulder of the hub and the pushing disk. The transmitting gear has a recess defined in each respective side of the transmitting gear, and two clutch pads are respectively received in the recesses in the transmitting gear and respectively abut the shoulder on the hub and the pushing disk. With such a clutching device, to replace the transmitting gear is not necessary while one of the clutching pads is worn away, such that the cost for maintaining the clutching device in a good operational condition is reduced.

Other objects, advantages and novel features of the invention will become more apparent from the following detailed description when taken in conjunction with the accompanying drawings.

DETAILED DESCRIPTION OF PREFERRED EMBODIMENT

Figure 1:
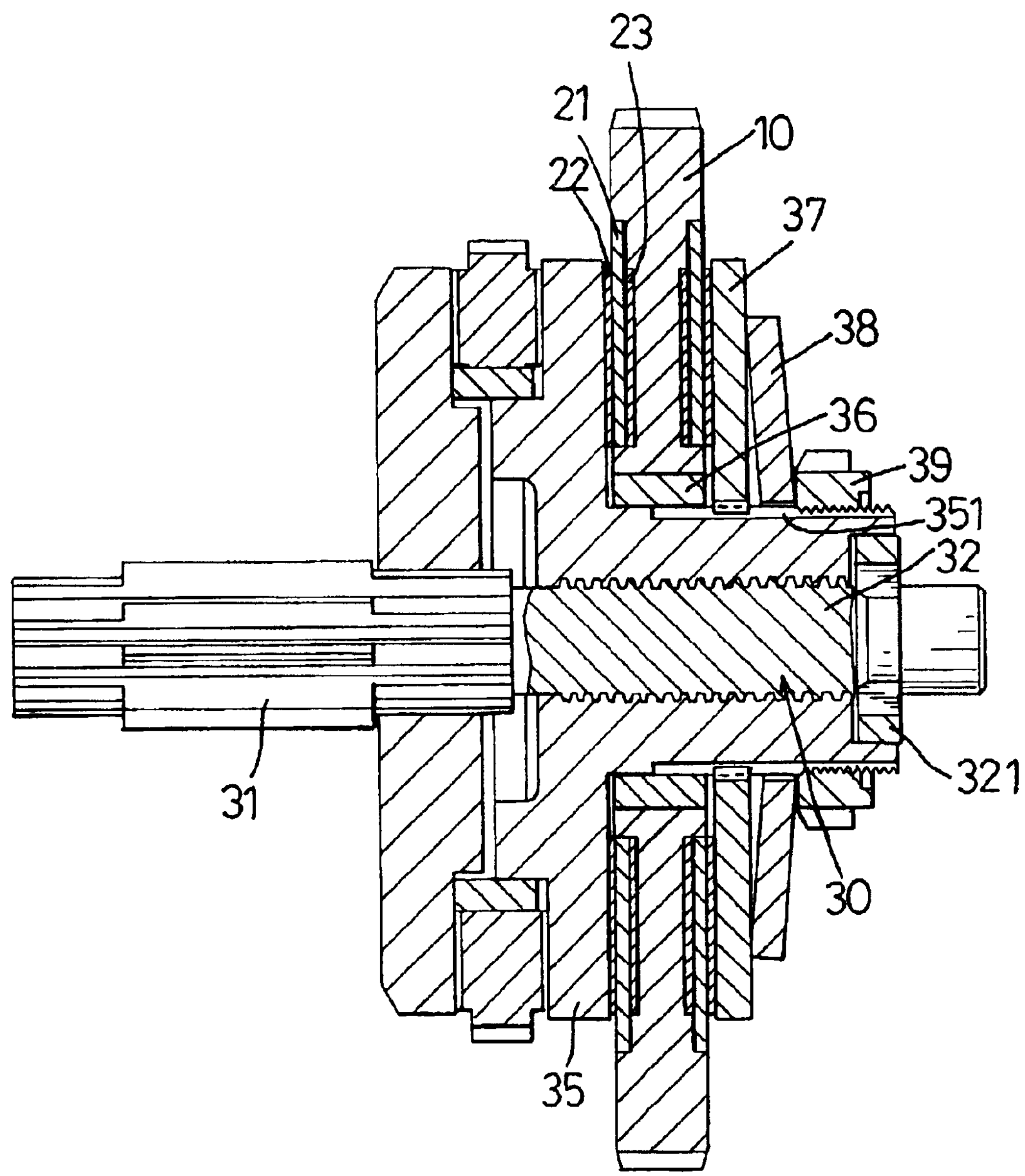
FIG. 1 is a side plan view in partial cross section of a clutching device in accordance with the present invention.
Figure 2:
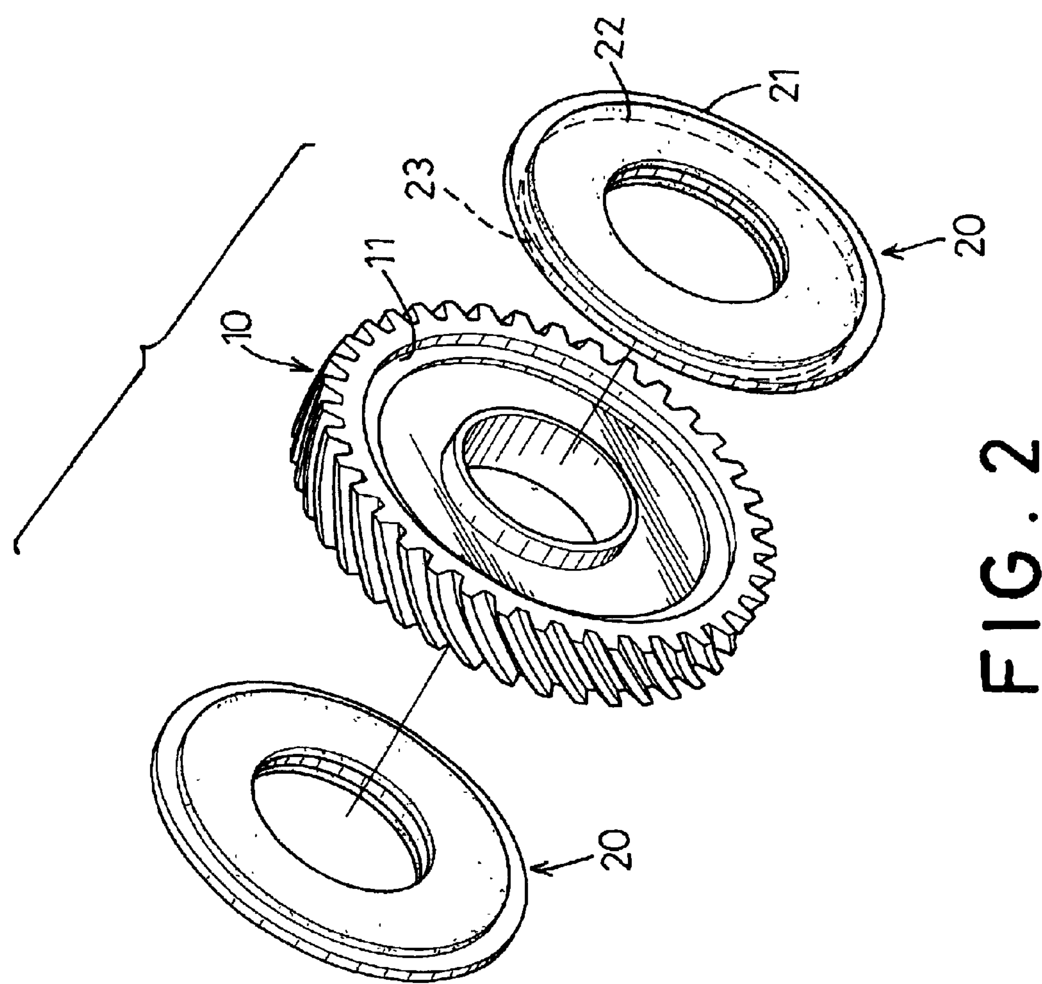
FIG. 2 is an exploded perspective view of the transmitting gear and the clutching pads of the clutching device in FIG. 1.
Figure 3:
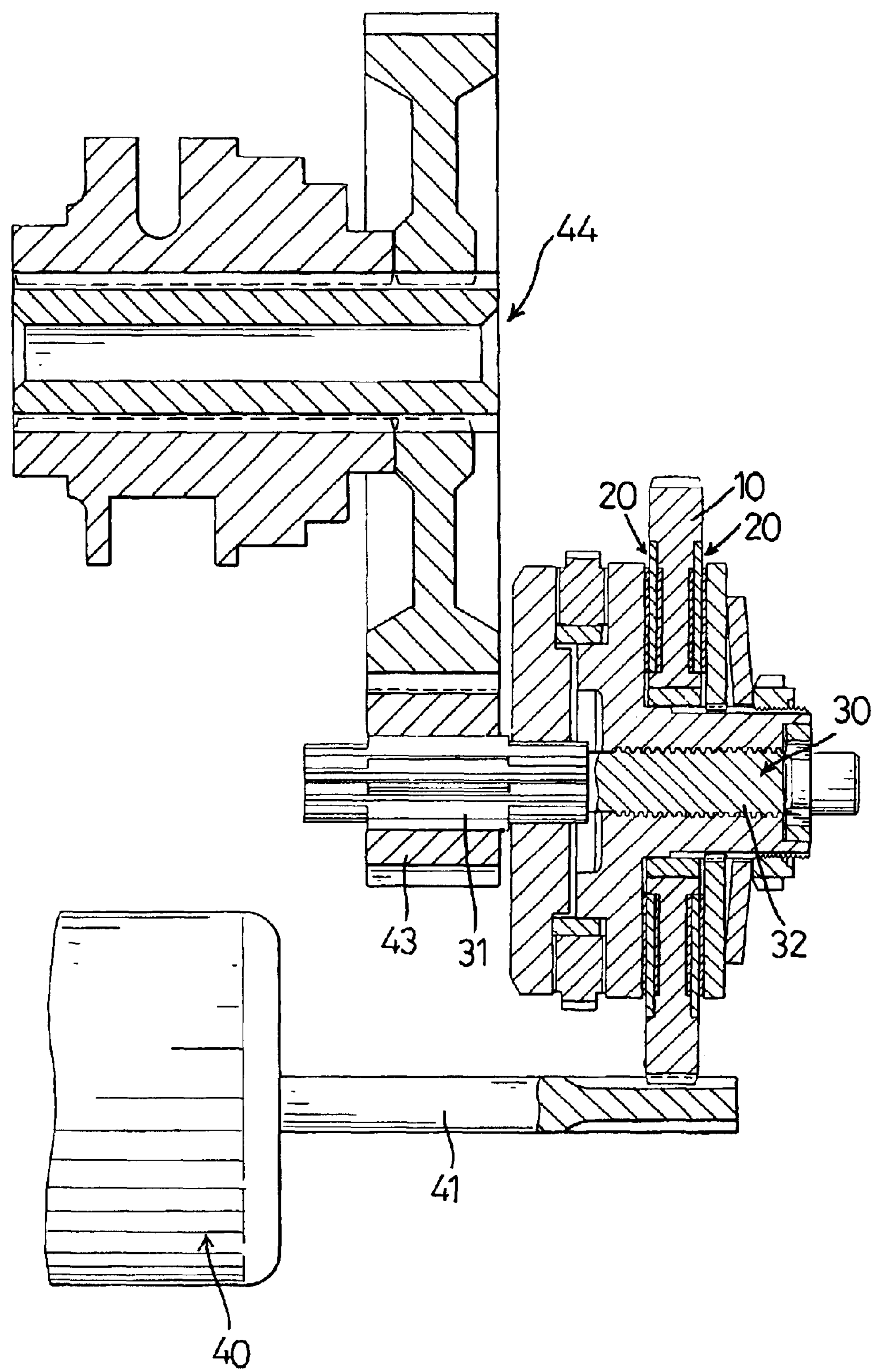
FIG. 3 is a side plan view in partial cross section of the clutching device in FIG. 1 with a motor and a lifting device of a crane.

With reference to FIGS. 1 to 3, a clutching device for a crane in accordance with the present invention comprises a main shaft (30), a hub (35), a pushing disk (37) and a transmitting gear (10). The main shaft (30) has a threaded portion (32) and multiple teeth longitudinally formed on the outer periphery of the main shaft (30) to form a transmitting portion (31) on the main shaft (30). The transmitting portion (31) is connected to the lifting device of the crane. The lifting device comprises a pinion (43) mounted on the transmitting portion (31) of the main shaft (30). The pinion (43) has inner teeth engaging with the teeth on the transmitting portion (31). A transmitted gear (44) with a chain wheel (not numbered) co-axially mounted on the transmitted gear (44) engages with the pinion (43). When the main shaft (30) rotates, the chain wheel will rotate with the transmission of the pinion (43) and the transmitted gear (44). The chain on the chain wheel will be reeled on the chain wheel to lift an object.

The hub (35) is securely attached to the main shaft (30). The hub (35) has a shoulder (not numbered) formed on one end of the hub (35) and an inner thread engaging with the threaded portion (32) on the main shaft (30). The hub (35) further has multiple teeth (351) longitudinally formed on the outer periphery of the hub (35). A securing ring (321) is securely attached to the main shaft (30) to abut one end of the hub (35) far from the shoulder so as to securely hold the hub (35) on the main shaft (30).

The pushing disk (37) is securely attached to the hub (35). The pushing disk (37) has multiple inner teeth defined in the center of the pushing disk (37) to engage with the teeth (351) on the hub (35), such that the pushing disk (37) will rotate with the hub (35). An elastic disk (38) is mounted on the hub (35) and abuts against the pushing disk (37) to provide a tension to push against the pushing disk (37). A securing collar (39) is securely mounted on the hub (35) to hold the elastic disk (38) on the hub (35).

The transmitting gear (10) is rotatably mounted on the hub (35) and is sandwiched between the shoulder of the hub (35) and the pushing disk (37). In practice, a bushing (36) is mounted around the hub (35) for the transmitting gear (10) being mounted around the bushing (36). With the arrangement of the bushing (36), the transmitting gear (10) can freely rotate relative to the hub (35). The transmitting gear (10) engages with the shaft (41) of the motor (40). The transmitting gear (10) has a recess (11) defined in each respective side of the transmitting gear (10). Two clutch pads (20) are respectively received in the recesses (11) in the transmitting gear (10). The clutch pads (20) respectively abut the shoulder on the hub (35) and the pushing disk (37). With the tension provided by the elastic disk (38), the clutch pads (20) will securely abut against the pushing disk (37) and the shoulder of the hub (35). In practice, each clutch pad (20) has a metal annular base (21) and two frictional pads (22, 23) respectively mounted on two sides of the annular base (21).

When the motor (40) is switched on, the transmitting gear (10) will rotate with the shaft (41) of the motor (40). The hub (35) will rotate with the transmitting gear (10) by means of the friction between the clutch pads (20) and the shoulder and the pushing disk (37), such that the main shaft (30) will rotate with the transmitting gear (10). Consequently, the lifting device connected to the main shaft (30) will be actuated to operate to lift an object.

When the loading on the lifting device begins to exceed the designated level, the loading applied to the main shaft (30) is larger than the friction between the clutch pads (20) and the shoulder and the pushing disk (37). The hub (35) will not rotate with the transmitting gear (10), such that the lifting device will not operate. This can prevent the object from falling during the lifting travel of the object, and a safety effect is provided.

When one of the clutching pads (20) is worn away, it is not necessary to replace the whole transmitting gear (10), instead only the worn pad (20) is replaced with a new one. The cost for maintaining the clutching device in a good operational condition is reduced.

Figure 4:
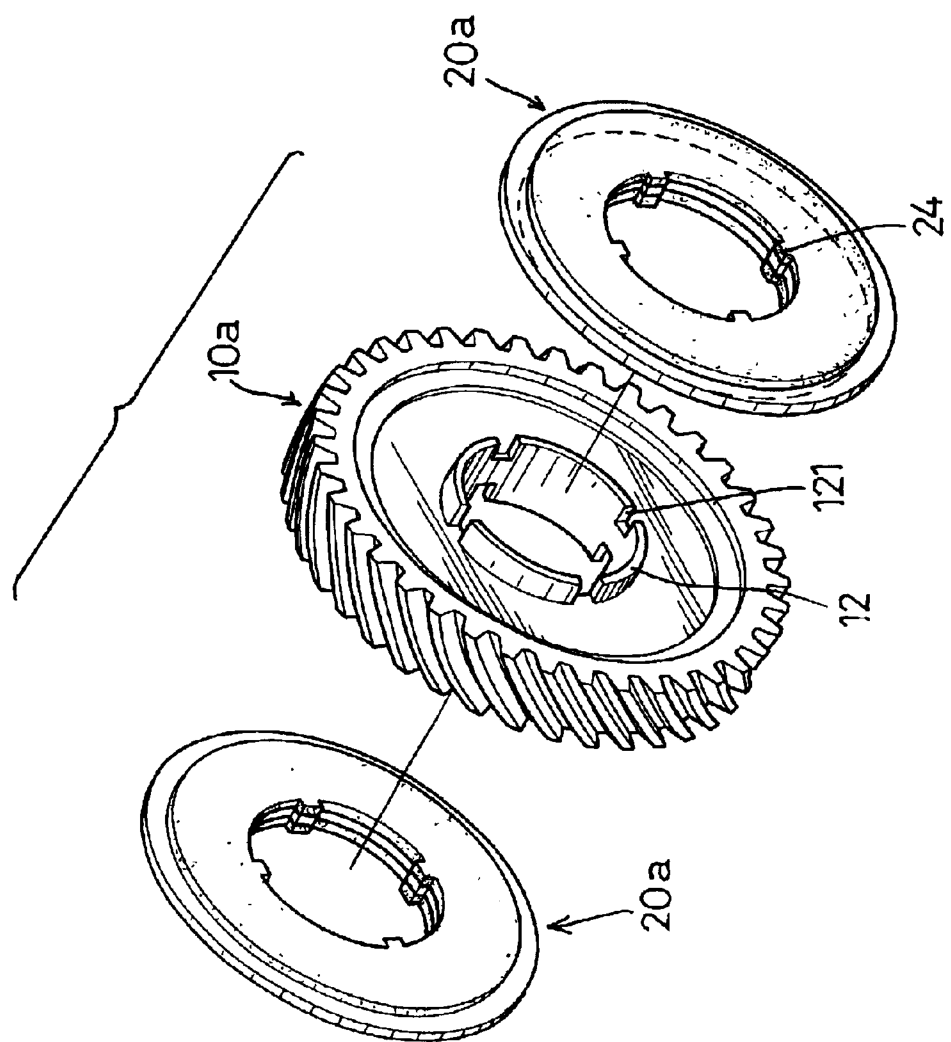
FIG. 4 is an exploded perspective view of a second embodiment of a transmitting gear and clutching pads in accordance with the present invention.
Figure 5:
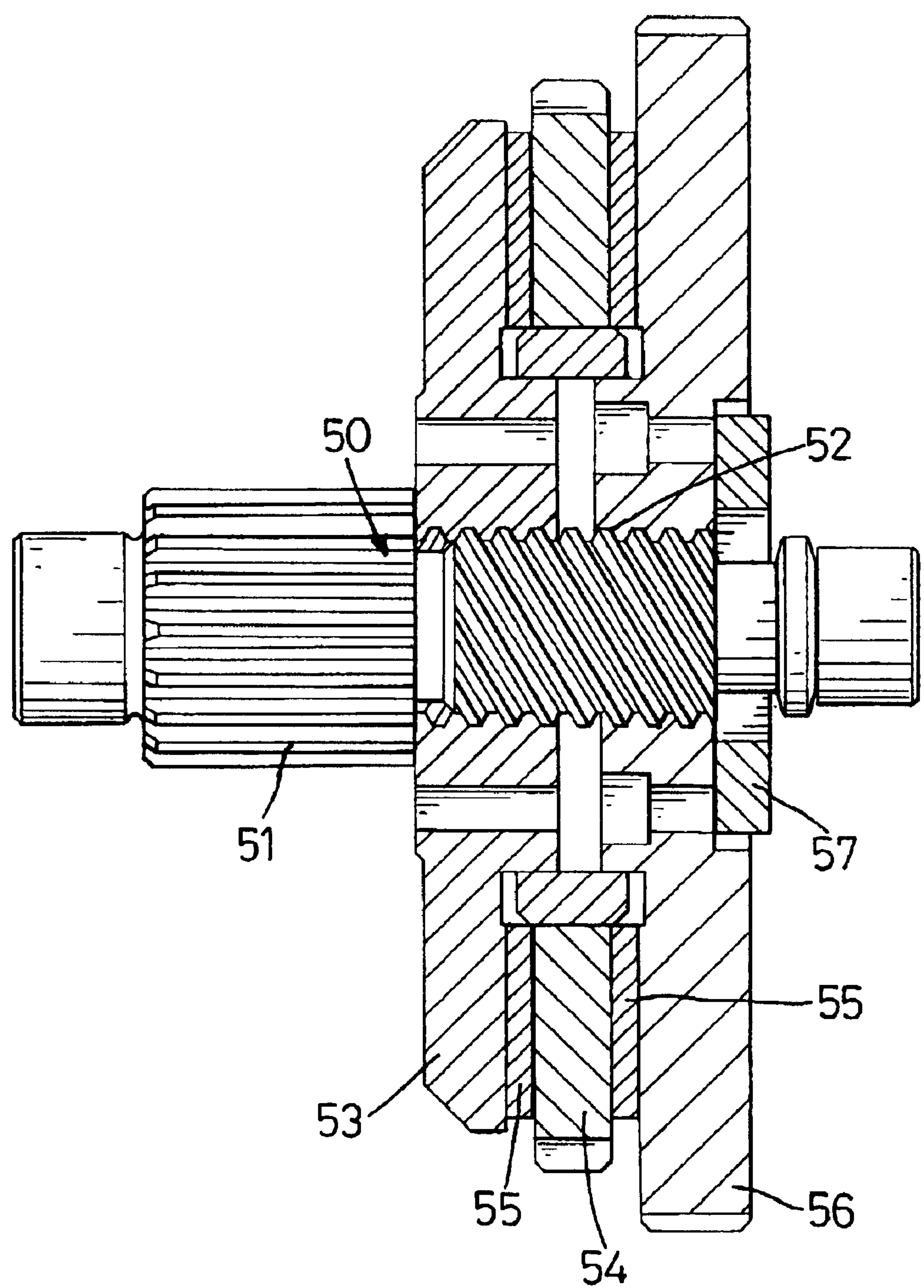
FIG. 5 is a side plan view in partial cross section of a conventional brake device for a crane in accordance with the prior art.
Figure 6:
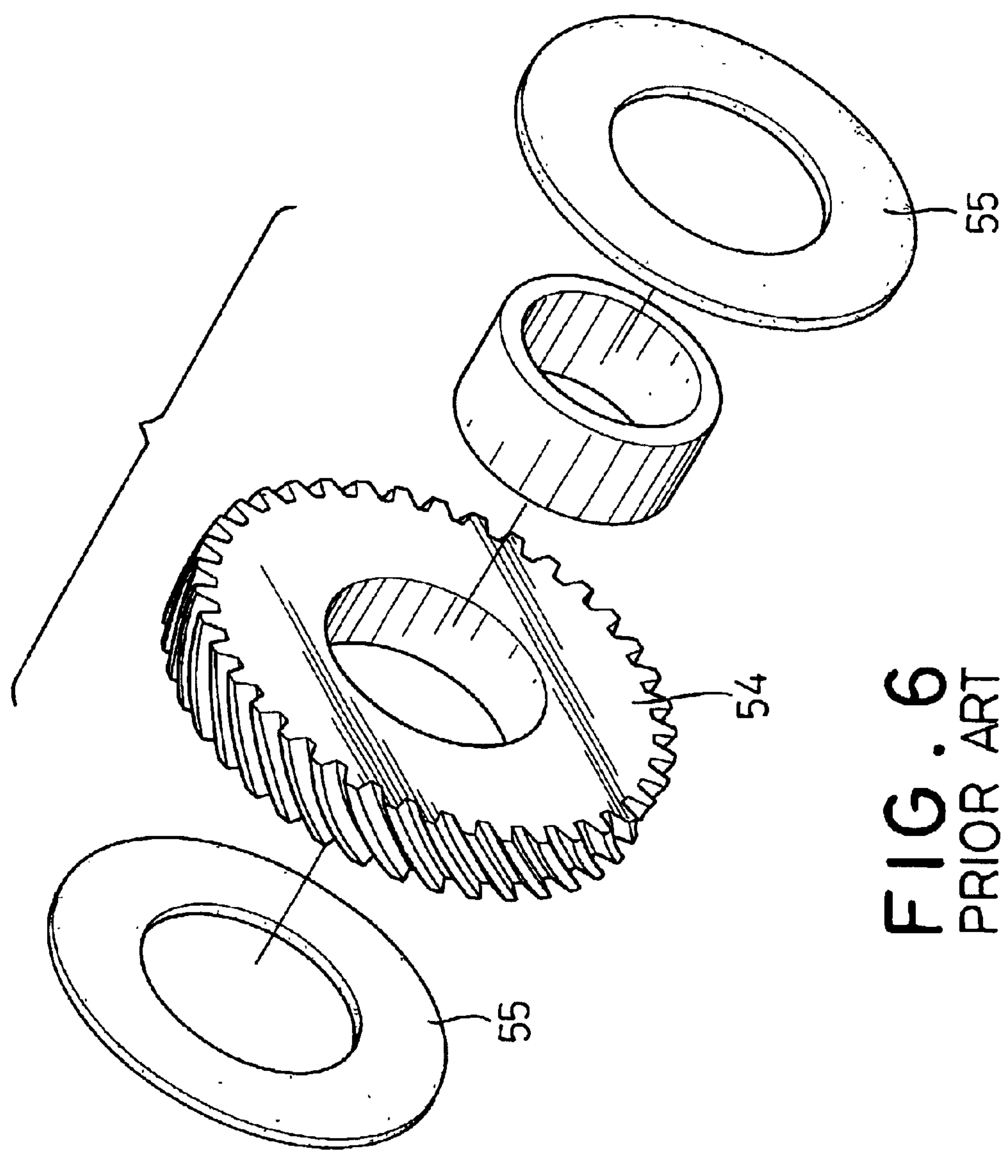
FIG. 6 is an exploded perspective view of the transmitting gear and brake pads of the brake device in FIG. 5.
Figure 7:
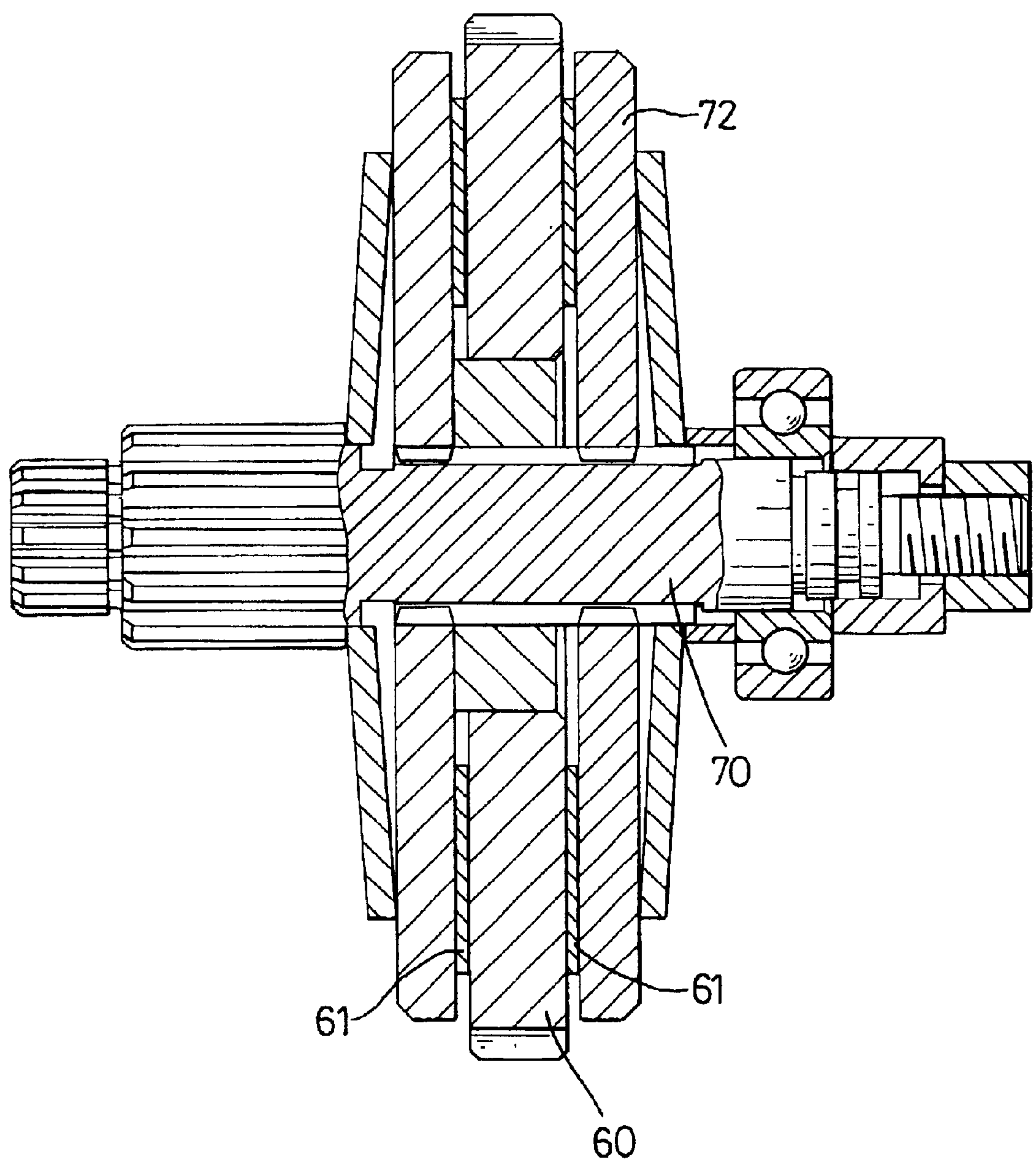
FIG. 7 is a side plan view in partial cross section of a conventional clutching device for a crane in accordance with the prior art.
Figure 8:
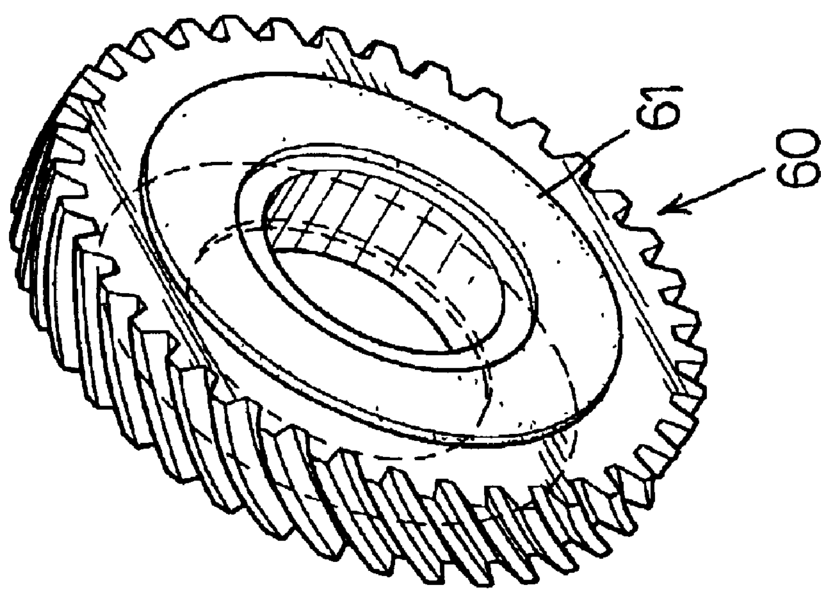
FIG. 8 is a perspective view of the transmitting gear with two clutching pads of the clutching device in FIG. 7.

With reference to FIG. 4, an annular flange (12) axially extends outward from each respective side of the transmitting gear **(10*a*) and surrounds the center of the transmitting gear (10*a*). Multiple notches (121) are defined in the free end of each respective flange (12). A knob (24) protrudes from the inner surface of the center of each respective clutch pad (20*a*) and engages with each respective notch (121) in the corresponding flange (12). With the engagement of the notches (121) and the knobs (24), the combination between the transmitting gear (10*a*) and each clutch pad (20*a*)** is improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clutching device for a crane comprising:

a main shaft;

a hub securely attached to the main shaft and having a shoulder formed on one end of the hub;

a pushing disk securely attached to the hub; and a transmitting gear rotatably mounted on the hub between the shoulder of the hub and the pushing disk, the transmitting gear having a recess defined in each respective side of the transmitting gear and two clutch pads respectively mounted in the recesses in the transmitting gear and respectively abutting the shoulder on the hub and the pushing disk, wherein each clutch pad has a metal annual base and two annular frictional pads mounted respectively on two sides of the annular base;

the transmitting gear has an annular flange axially extending outward from each respective side of the transmitting gear around the center of the transmitting gear;

each respective flange has multiple notches defined in a free end of the flange; and each respective clutch pad has a knob protruding from an inner surface of a center of the clutch pad and engaging each respective notch in the corresponding one of the flanges.

2. The clutching device as claimed in claim 1, wherein the main shaft has a threaded portion; and the hub has an inner thread to engage with the threaded portion on the main shaft.

3. The clutching device as claimed in claim 2, wherein the main shaft further comprises multiple teeth longitudinally formed on an outer periphery of the main shaft to form a transmitting portion on the main shaft.

4. The clutching device as claimed in claim 3, wherein the hub has multiple teeth longitudinally formed on an outer periphery of the hub; and the pushing disk has multiple inner teeth defined in a center of the pushing disk to engage with the teeth on the hub.

5. The clutching device as claimed in claim 4 further comprising an elastic disk mounted on the hub and abutting against the pushing disk to push the pushing disk to abut the corresponding one of the clutching pads in the transmitting gear; and a securing collar securely mounted on the hub to hold the elastic disk on the hub.

6. The clutching device as claimed in claim 5 further comprising a securing ring securely attached to the main shaft to abut one end of the hub far from the shoulder so as to securely hold the hub on the main shaft.

7. The clutching device as claimed in claim 1, wherein the hub has multiple teeth longitudinally formed on an outer periphery of the hub; and the pushing disk has multiple inner teeth defined in a center of the pushing disk to engage the teeth on the hub.

8. The clutching device as claimed in claim 7 further comprising an elastic disk mounted on the hub and abutting the pushing disk to push the pushing disk to about the corresponding one of the clutching pads in the transmitting gear; and a securing collar securely mounted on the hub to hold the elastic disk on the hub.

9. The clutching device as claimed in claim 8 further comprising a securing ring securely attached to the main shaft to abut one end of the hub far from the shoulder so as to securely hold the hub on the main shaft.

10. The clutching device as claimed in claim 1 further comprising an elastic disk mounted on the hub and abutting the pushing disk to push the pushing disk to abut the corresponding one of the clutching pads in the transmitting gear; and a securing collar securely mounted on the hub to hold the elastic disk on the hub.

11. The clutching device as claimed in claim 10 further comprising a securing ring securely attached to the main shaft to abut one end of the hub far from the shoulder so as to securely hold the hub on the main shaft.

12. The clutching device as claimed in claim 1 further comprising a securing ring securely attached to the main shaft to abut one end of the hub far from the shoulder so as to securely hold the hub on the main shaft.

13. The clutching device as claimed in claim 1 further comprising a bushing mounted around the hub around which the transmitting gear is mounted.

* * * * *